United States Patent [19]

Logeman

[11] Patent Number: 4,734,731

[45] Date of Patent: Mar. 29, 1988

[54] FILMSPEED-CORRECTED DIGITAL EXPOSURE CONTROL SYSTEM FOR ELECTRONIC CAMERAS

[75] Inventor: John Logeman, Park Ridge, Ill.

[73] Assignee: W. Haking Enterprises Limited, North Point, Hong Kong

[21] Appl. No.: 6,149

[22] Filed: Feb. 5, 1987

[51] Int. Cl.⁴ ............................................. G03B 7/091
[52] U.S. Cl. ..................................... 354/410; 354/435
[58] Field of Search ................. 354/21, 410, 412, 426, 354/435, 441, 446, 456, 458, 459, 463

[56] References Cited

U.S. PATENT DOCUMENTS 4,074,289  2/1978  Nobusawa .......................... 354/458
4,623,231  11/1986  Saito et al. ............................ 354/21

Primary Examiner—W. B. Perkey

Attorney, Agent, or Firm—Russell E. Hattis; Stephen R. Arnold

[57] ABSTRACT

A microprocessor-controlled exposure control system for a camera uses a modified analogue-to-digital ramp-type converter to trigger an amplitive comparator after a time lapse proportional to the scene brightness as sensed by a photosensor. The comparator output is interrogated at a rate algorithmically governed according to filmspeed sensings to provide an interrogation rate proportional to the filmspeed. A running tally of the number of interrogations until the comparator triggers is kept in memory storage, the resulting number being a digital representation of the filmspeed-scene brightness product. The need for algorithmic multiplication of the digital representations of these two numbers is eliminated.

7 Claims, 5 Drawing Figures

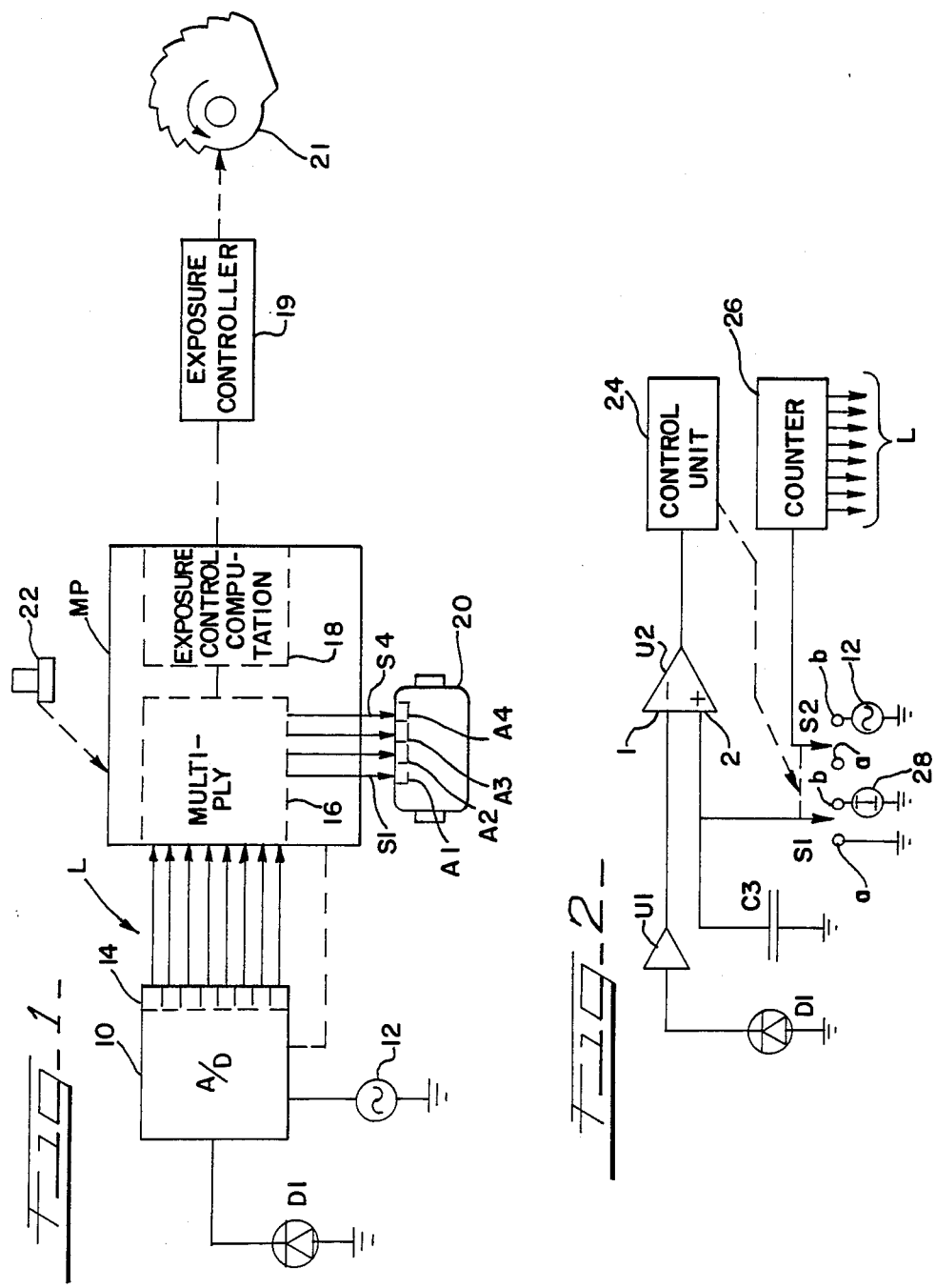

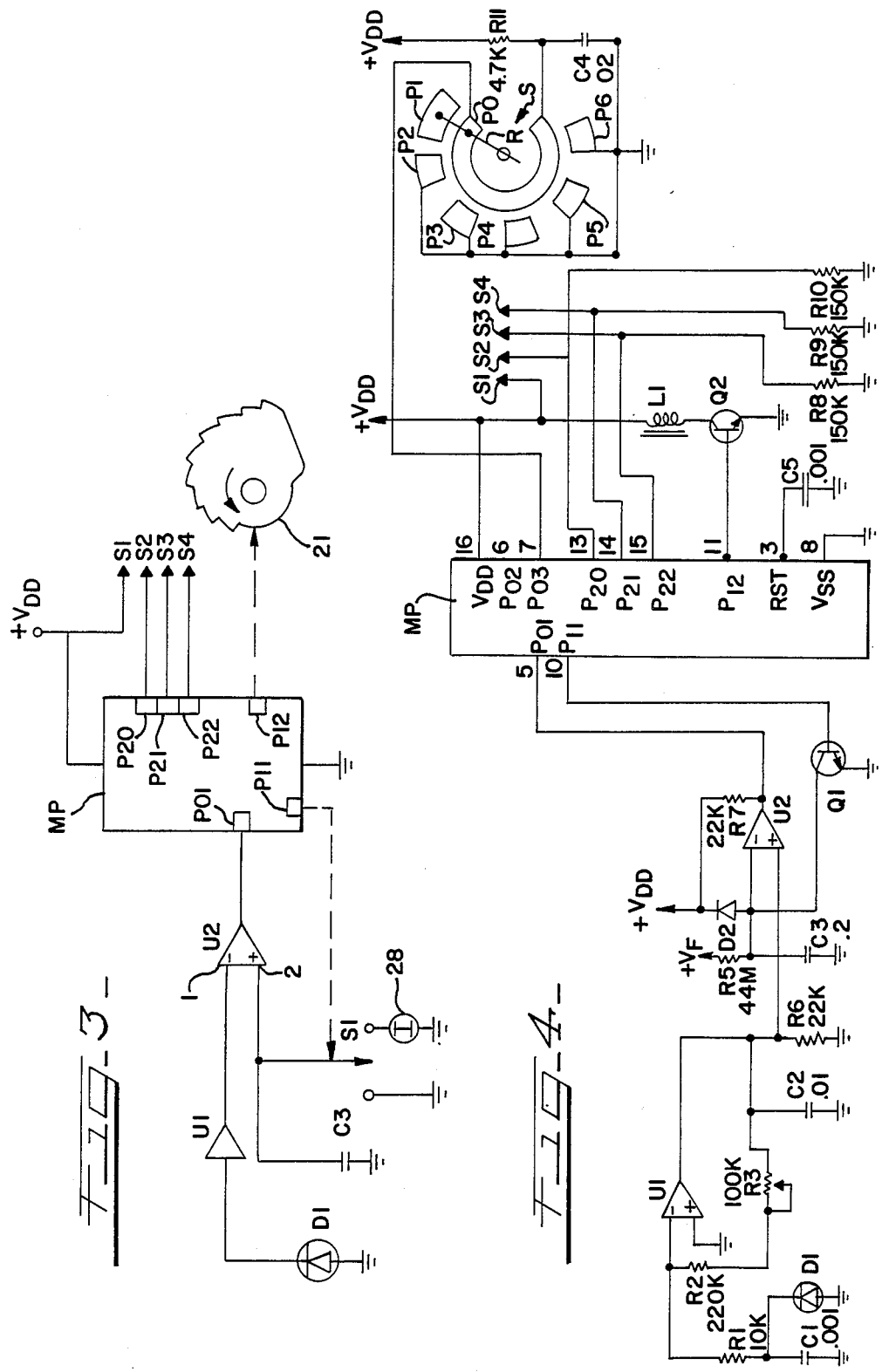

FILMSPEED-CORRECTED DIGITAL EXPOSURE CONTROL SYSTEM FOR ELECTRONIC CAMERAS

DESCRIPTION

1. Technical Field

The technical field of the invention is electronic digital control systems, and in particular such systems as applied to electronically controlled cameras.

2. Background of the Invention

The utility of the modern microprocessor as a means for simultaneously operating camera control and sensing systems has led to their incorporation into electronically controlled cameras. Thus, under microprocessor control it is possible to convert analogue scene illumination sensings to digital form, and to correct the stored representations for filmspeed as sensed, for example, from probes making contact with a DX TM cartridge. From these two values, a number governing the appropriate setting of an aperture control member of one sort or another may be computed. Also, such microprocessor systems may be used to interpret the photosensings of a ranging pre-flash of light produced by the camera flash unit, to convert these sensings to a range-representing number, to control the setting of a focus-adjusting member therefrom, and to correct the exposure control member setting according to range when flash illumination is used. Additionally, a great variety of warning functions may be simultaneously or nearly simultaneously carried out, such as control of light-emitting diodes indicating, for example, a scene illumination so low that flash is required.

FIG. 1 shows in block schematic form one way which the applicant initially considered for carrying out exposure control. Scene brightness sensings detected by a photosensor D1 provide an analogue signal having an amplitude related to scene brightness, this amplitude being converted to a binary representation by a analogue-to-digital converter 10. As will be discussed subsequently with respect to FIG. 2, such converters normally have associated therewith an oscillator 12 providing a finite train of timing impulses, and the total number of such timing pulses in this train is controlled so as to be proportional to the magnitude of the analogue signal, this number being stored in an output register 14 of the converter 10.

As applied to digital control of a camera, a microprocessor MP, performing an algorithmic multiplication function 16 and an algorithmically steered exposure control computation function 18, receives the contents of the converter output register 14 from parallel lines L, the microprocessor having probes S1–S4 connected thereto for sensing the filmspeed from a series of speed-representing coding areas A1–A4 on the outer surface of a film cartridge 20. By algorithmic multiplication, a digital representation proportional to the product of the count stored in the register 14 and the filmspeed is formed, this representation being a measure of the filmspeed-brightness product. This number is then used, after suitable conversion, to govern an exposure controller 19, this exposure controller causing, in the example shown, a rotating exposure-controlling cam 21 to be properly oriented to give the correct exposure when the shutter is actuated. Initiation of this conversion process is caused by initial partial depression of shutter release button 22; however, it is preferred that the conversion process be a continuous one when the camera is in use.

FIG. 2 shows in more detail how the analogue-to-digital conversion shown in FIG. 1 is carried out. The photosensing signal from the photosensor D1 is fed to an amplifier U1 whose analogue output voltage level is fed to one terminal of a comparator U2. The other terminal of the comparator U2 is connected to a grounded integration capacitor C3. A control unit 24 initially grounds the capacitor-connected terminal of the comparator U2 and holds the oscillator 12 disconnected from a counter 26. As shown symbolically in FIG. 2, this operation would be carried out by actuation of switches S1 and S2 to make rotor contact to poles a,a respectively. At some time in the adjustment process, the control unit 24 causes the oscillator 12 to be connected to the counter 26 and a constant current source 28 to be cut in to begin charging the capacitor C3. The voltage at terminal 2 of the comparator therefore rises substantially linearly with time until it equals the input to the other terminal 1, at which time an output signal from the comparator U2 causes the control unit 24 to disconnect the oscillator 12 from the comparator and to discharge the capacitor C3. The stored count in the counter 26 is then ready for multiplication.

The large number of camera systems to be controlled, and the mathematical conversions attendant thereto, impose severe demands upon the limited memory system of the microprocessor. For cameras of intermediate expense, current cost considerations virtually mandate that the microprocessor be quite inexpensive, which in turn has led to the employment of very simple microprocessors having a limited instruction set, a programmed memory (ROM) capacity of 500 words or so, and a restricted memory (RAM). A typical microprocessor used for such purposes, taken for illustrative purposes only, is the Model No. TMP42C40P, manufactured by Toshiba, and having 512 words of read-only memory (ROM), and 32 4-bit words of random access memory (RAM). In particular, such simple microprocessors have no internal multi-byte multiplication capability, which poses a severe problem with respect to automatic exposure control, as will be set forth next.

Automatic exposure control using microprocesors of such limited capability poses a difficult problem because of the range of numerical values involved. In such systems one may multiply the digital representation of scene illumination by a second digital number representing the filmspeed. This brightness-filmspeed product is then used, after algorithmic conversion, to control the exposure setting of the camera. Quite commonly, this exposure control will take the form of a stroke-limiting cam used in conjunction with a variable-aperture type shutter of the kind disclosed in Taiwan patent application No. 75100599 filed Feb. 13, 1986 by W. Haking Enterprises Limited, wherein the cam is electronically positioned to one of a number of orientations, typically of the order of eight and preferably ten, according to the filmspeed-brightness product. Although the final controlling number that must be produced by the microprocessor need merely take the range of one to eight or so, it results from a range of filmspeed-brightness product values spanning a considerable magnitude. Thus, a typical daylight operating mode for a camera will require that scene sensings in the range of 10 foot-lamberts (dark cloudy day) to 1400 foot-lamberts (bright sunlight) must be accommodated. Here, any digital representation of the scene brightness must therefore span a numerical range of 140 to one. It will be noted that in 4-bit representation, at least 2 bytes are required to contain the number 140.

A typical range of filmspeeds for use in such a camera would take the values ASA 100, ASA 200, ASA 400 and ASA 800. Thus, normalizing the filmspeeds to the values 1, 2, 4 and 8, even the simplest representation of the filmspeed-brightness product must accommodate a normalized range of numerical values from 1 to 1120, i.e., 140 multiplied by 8. Such a multiplication of a 2-byte number by a 1-byte number cannot be performed internally by such elementary microprocessors, since, as mentioned previously, they commonly lack even a rudimentary multiplication capabiltiy in their command set. As a result of this limitation, such multiplication must be done algorithmically, and would require a sizable portion of stored program memory to accomplish this one function alone. Because of the severe limitation on memory space necessary to govern all of the camera systems, this represents a serious loss. There is a need for an improved way for formulating in digital representation the filmspeed-brightness product.

SUMMARY OF THE INVENTION

The equivalent of the abovementioned multiplication of the scene brightness by filmspeed is achieved by dispensing with the customary oscillator and counter in the analogue converter described in the Background of the Invention, and the amplitude comparator is instead constantly interrogated from a port of a microprocessor at periodic intervals during the charging process. A running tally representative of the total number of such interrogations is kept in a register in the microprocessor. The interrogations continue until triggering of the amplitude comparator is sensed at that port, at which time the count is frozen, this number being thereafter processed to govern the exposure control. Cartridge probe filmspeed sensings are sensed directly at four input ports of the microprocessor and are converted by an elementary algorithm to a normalized number, e.g., 1, 2, 4, or 8, according to the sensed filmspeed.

According to a feature of the invention, this number is used to govern an internal algorithmic timing loop which governs the rate of interrogation of the port which senses the comparator output state, so that the rate of interrogation is proportional to the normalized filmspeed. Thus, for a given scene brightness requiring a certain time for the capacitor to be charged to a point where it triggers the comparator, a filmspeed of 800 will give a count eight times as great as would result if a filmspeed of 100 were sensed. The necessity for a subsequent space-wasting speed-intensity multiplication algorithm is thereby totally eliminated.

Other features and aspects of the invention will become apparent upon making reference to the specification, claims, and drawings to follow.

DESCRIPTION OF THE DRAWINGS

FIG. 1 shows in block schematic one form of a microprocessor-governed exposure control system for forming a filmspeed-scene brightness intensity product in digital form by multiplication of a digital representation of the scene brightness by filmspeed sensings;

FIG. 2 shows in generally schematic form the analogue-to-digital converter system shown in FIG. 1;

FIG. 3 shows in generally schematic form the principal aspects of the circuit of the present invention;

FIG. 4 is a circuit diagram of the principal circuit elements necessary to implement the system illustrated in FIG. 3.

DESCRIPTION OF THE INVENTION

Figure 5:
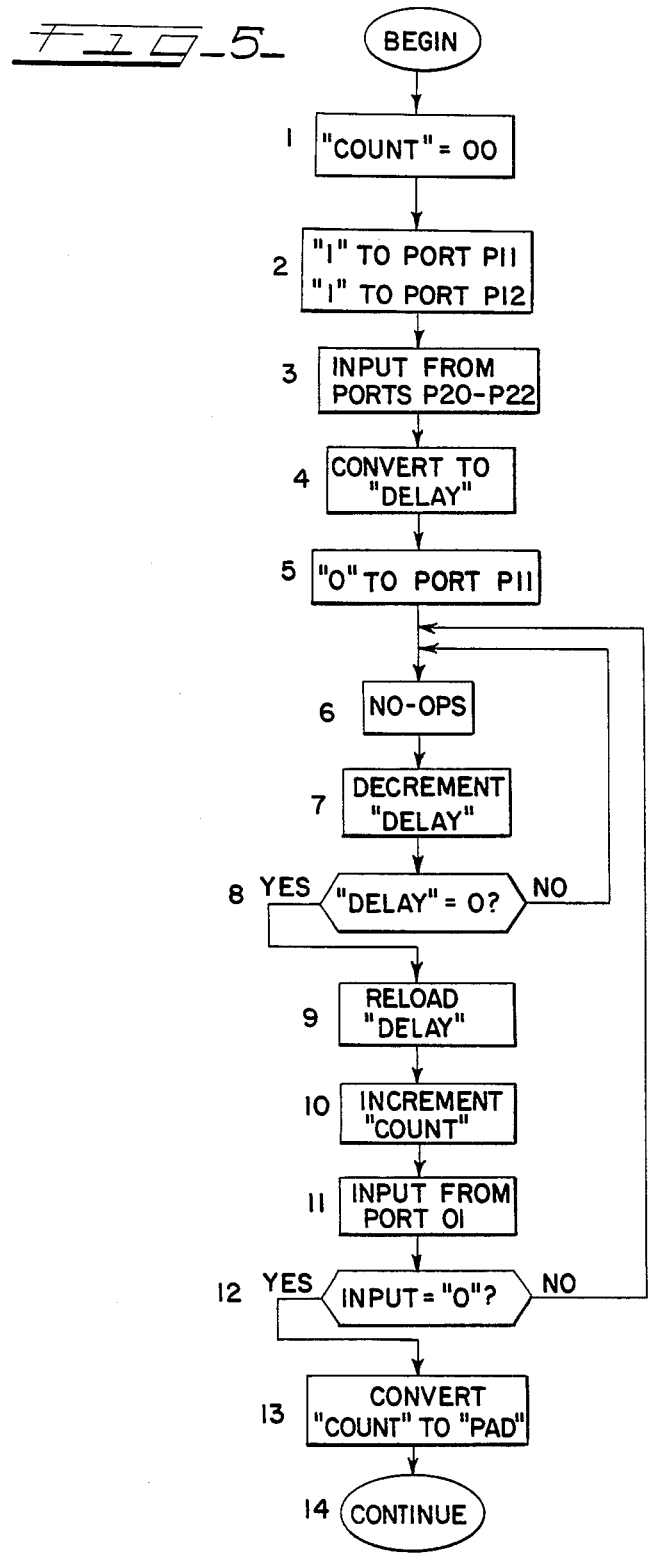
FIG. 5 is a flow chart of a timing algorithm governing the operation of the microprocessor during the speed-brightness conversion process.

FIG. 3 shows the prinicipal aspects of the circuitry of the present invention. A microprocessor MP has three input sensing ports P20–P22 connected to sensing probes S2–S4 for sensing the coded filmspeed on the film cartridge, as previously discussed with respect to FIG. 1. Output port P12 is used to control the final position of an exposure-limiting element, here taken to be for illustrative purposes a stroke-limiting exposure control cam 21. Light falling on photodiode D1 is amplified by amplifier U1 to go to terminal 1 of comparator U2. Initially, the output state of port P11 is governed algorithmically so as to ground capacitor C3 by a controlled switching element S1. Subsequently, by internal algorithmic means, port P11 releases switch S1 to cause a constant current from a generator 28 to charge the capacitor C3 at a linear rate, thus causing the voltage at terminal 2 of amplitude comparator U2 to rise. By means of an internal timing algorithm, to be subsequently discussed, port P01 senses the output state of comparator U2 at intervals governed by the filmspeed sensings, the interrogation rate being governed such that the higher the filmspeed, the higher the interrogation rate. The number of such interrogations is stored as a running tally in the microprocessor MP until a transition is detected. The running tally at the time of this transition is thus a measure of the film brightness-filmspeed product. This number, stored in register is of the microprocessor MP, is then used to govern the timing of an appropriate pulse sent to output port P12 to arrest the rotation of the exposure control cam 21.

FIG. 4 shows additional circuit details of the system schematically represented in FIG. 3. System voltage $V_{DD}$ can be of the order of 3 volts, and in the preferred form is applied to the elements of the system only upon initial depression of the shutter button 22. Such shutter button-actuated power-on switches as applied to cameras are long known in the art. Capacitor C5 is connected to reset pin 3 of the microprocessor MP. An internal impedance of about 150 kilohms is present in the microprocessor MP between the power terminal $V_{DD}$ and the reset pin 3. As a result, the microprocessor MP is held momentarily in a reset condition as power is initially applied. By this means the program stored in the microprocessor will be executed from its proper starting point to govern system operations. As will subsequently be discussed with respect to the algorithm stored in the microprocessor, one of the immediate effects of initiating operation of the stored program is to output a high state to output port P11 (pin 10), thereby raising the base of transistor Q1 high with respect to its emitter, so as to render this transistor in a conducting state. The result of this is to bleed any residual charge on transistor C3 to zero. This state will be maintained until the initiation of an analogue-to-digital conversion.

Ambient light is detected by diode D1 and fed through resistor R1 to the inverting terminal of amplifier U1. The non-inverting terminal is grounded. The amplified photo signal produced at the output of amplifier U1 is fed to the non-inverting input of comparator U2. Thus, increasing scene illumination falling on diode D1 causes a positive signal of increasing strength to occur at the non-inverting input terminal of amplifier U2. A feedback loop consisting of resistor R2 and variable resistor R3 is employed to provide for proper system calibration. Capacitor C1 is inserted purely for noise suppression purposes. Amplifiers U1 and U2 are of the bipolar type, as for example the type LM324 and LM339. Resistor R7 is the collector load resistor for the comparator U2 output stage.

As previously mentioned, the conversion process is initiated by a program-controlled high-to-low transition at output port P11, thereby removing the shorting action of transistor Q1 on capacitor C3. Upon such release, a source of high voltage $V_F$, preferably of the order of 300 volts and derived from an associated electronic flash power supply (not shown), proceeds to charge capacitor C3 through resistor R5. The rate of rise of the voltage across capacitor C3 during this process is very nearly linear throughout the region of interest, i.e., 0–3 volts. Diode D2 prevents excessive voltage from being applied to comparator U2.

Throughout the charging process, the status of the comparator-amplifier U2 is interrogated by program-controlled sensings of the state of input port P05. As previously mentioned, and as will be subsequently discussed in more detail, the rate of such interrogations is governed according to filmspeed so that the total number of interrogations until comparator U2 is triggered represents a measure of the scene brightness-filmspeed product.

Filmspeed sensings are relayed to sensing ports P20–P22 by means of probes S2–S4 pressing against the respective sensing areas of the film cartridge, as previously explained. Probe S1 provides battery voltage to the sensing areas of the cartridge. Sensing ports P20–P22 are held in a low state by resistors R8–R10 respectively, but are selectively pulled to a high state when their associated probes touch a contacting area on the cassette. Thus, there is constantly present at sensing ports P20–P22 the necessary speed-representing sensing conditions for converion to a number representative of filmspeed.

The computation of the filmspeed-scene brightness product having been carried out, the mechanical elements of the exposure control system are set into motion. Sensing of the position of the exposure control member, here taken for illustrative purposes to be a shutter stroke-limiting cam, is achieved by counting pulses received at sensing port P03, here shown connected to the rotor R contactor P0 of the rotary switch driven synchronously with the stroke-limiting cam 21 (FIGS. 1, 3). It will be noted that the rotor is thus continuously connected to the battery voltage $V_{DD}$ through resistor R11, and it will be further noted that rotor pads P2–P6 are all connected to ground. Thus, as the cam 21, and the rotor R are simultaneoulsy driven during the exposure adjustment operation, the voltage sensed at input sensing port P03 will drop to zero whenever the rotor R is in contact with any of the pads P2–P6, and will rise to the battery voltage $V_{DD}$ during those times when the rotor is traversing the intermediate regions therebetween.

In operation, the rotor R would be returned to the initial position shown contacting P1 when the camera is cocked. Upon initial depression of the shutter button, or opening of the shutter door, system voltage $V_{DD}$ is applied, and the execution of the program starts, computing virtually instantaneously the filmspeed-brightness product to govern the final terminal setting the rotor R. Further depression of the shutter button causes mechanical release of spring-driven shutter actuation and exposure control systems of the camera, whereby the exposure control cam is driven through a range of settings to be interrupted at a given position by timely energization of a drop-in solenoid L1, thereby establishing proper cam orientation to set the exposure. Such systems are long known in the art, as exemplified, for example, by the teachings of U.S. Pat. No. 4,473,285 issued to Winter on Sept. 25, 1984.

To achieve this in the present system, the state at output control port P12 is held high during exposure adjustment, so that the base of transistor Q2 is held high, as a result of which the drop-in arresting solenoid is initially de-energized. As will subsequently be discussed with respect to the algorithm, the scene-brightness product is converted to one of generally nine values representing nine possible terminal settings of the rotor R. This value is then selected and held in storage to govern the adjustment process. When the proper number of changes of state have been detected at sensing port P03 so as to correspond to this stored count, output port P12 is automatically driven to a low state to de-energize transistor Q2 so that the drop-in solenoid L1 arrests the rotation of rotor R at the proper orientation.

FIG. 5 shows a representative flow chart for governing the conversion process. A stored 2-byte number, hereinafter designated as COUNT, is initialized in the microprocessor memory to the value 00. In step 2 a high-state is outputted to port P11, thereby raising the base of transistor Q1 and placing this element in a conducting condition, thus rapidly bleeding off any residual charge on capacitor C3. Simultaneously, control port P12 is held high to energize transistor Q2.

In step 3 the ports P20–P22 are interrogated to replicate the state of the filmspeed sensing code probes S2–S4. In step 4 these sensings are converted by straightforward algorithmic means to store in memory at a location, hereinafter designated as DELAY, a normalized number representative of the reciprocal of the normalized filmspeed. Recalling that the normalized filmspeeds may be taken to be 1, 2, 4, and 8, the values corresponding to these stored in DELAY are 8, 4, 2, and 1 respectively. As will subsequently be evident, the number stored in location DELAY will govern the duration of the interval between interrogations of the comparator U2 so that low filmspeed values give rise to a reduced rate of interrogation. Various algorithmic means for carrying out such a conversion will be readily evident to those knowledgeable in the art.

In step 5 a low state ("0") is placed at the output of port P11, thereby turning off transistor Q1 and releasing grounded condition on the upper terminal capacitor C3, thereby allowing the charging process to begin. In step 6 a string of no-ops (nullity operators, e.g., "00") are placed in the algorithm, the number of such no-ops in combination with the number stored as DELAY determining traversal time in an inner loop defined by steps 6, 7, and 8. In step 7 the contents of DELAY is decremented one COUNT, and in step 8 the contents of DELAY is tested for a zero condition. Steps 6, 7, and 8 continue to be traversed, with accompanying decrement of the contents of DELAY during each tour, until a zero value of COUNT is achieved, at which time one interrogation of the output of the comparator U2 is carried out, as set forth in steps 9, 10, and 11.

In step 9 the contents of DELAY are restored to their original value and in step 10 the number of interrogations stored in COUNT is incremented by one.

In step 11 an interrogation of the output of comparator U2 is carried out by reading the state of port 01. In step 12 a comparison is made between this input sensing as compared to zero. It will be recalled that the output of comparator U2 will be in a high state during the charging process until the voltage on capacitor C3 is equal to the ambient illumination sensing, at which time a low state appears at the output of this comparator. In the event that such triggering has not occurred, then the program returns to step 6 to carry out the process again, i.e., waiting for an additional increment of time set by the contents of DELAY, as adjusted for filmspeed, and once again incrementing COUNT and testing for the state of the output of comparator U2.

Once the comparator U2 has triggered, branching will occur from step 12 to continue at step 13. At this point the value stored in COUNT gives the number of interrogations, which were spaced apart in time by an amount set by the contents of DELAY, to yield a value stored in COUNT as a product of filmspeed and scene illumination.

Step 13 represents conversion of the filmspeed-brightness product stored in COUNT, appropriately converted to, for example, a pad number (PAD) ranging from 1 to 9, to govern the arresting of the rotor R at one of the pads P2-P6 or one of the spaces therebetween, thereby arresting the rotation of the synchronously driven aperture or exposure control element, e.g., cam 21 at one of nine positions. One such system is described in the previously mentioned U.S. Pat. No. 4,473,285. Each range of filmspeed-brightness products has assigned thereto a corresponding pad number value preferably chosen such that each integer increment of the numbers stored in PAD, i.e., the pad number, corresponds to a factor of 2 change in exposure as the rotor R moves from one of the nine positions thereof to the next. The determination of the pad value from the filmspeed-brightness product is preferably carried out by table look-up techniques.

Step 13 has been added herein for the sake of completeness only, and the detailed means for implementing such a step will be readily apparent to those knowledgeable in the art, the principal aspect of the present invention having been achieved at step 12 when the number stored in COUNT is a true measure of the filmspeed-brightness product.

While the invention has been described with reference to a preferred embodiment, it will be understood by those skilled in the art that various changes may be made and equivalents may be substituted for elements thereof without departing from the broader aspects of the invention. Also, it is intended that broad claims not specifying details of a particular embodiment disclosed herein as the best mode contemplated for carrying out the invention should not be limited to such details. Furthermore, while, generally, specific claimed details of the invention constitute important specific aspects of the invention in appropriate instances even the specific claims involved should be construed in light of the doctrine of equivalents.

I claim:

1. In an electrically controlled camera having scene-sensing photosensing means for providing an analogue signal indicative of the level of scene illumination, filmspeed entry means for providing an electrical signal condition indicative of filmspeed, conversion means responsively coupled to said photosensing means and said filmspeed entry means for providing a digital representation of the product of filmspeed and scene illumination, memory means for storing said product, and exposure control means for adjusting exposure according to said stored product, the improvement comprising:

timing means responsive to said analogue signal and actuatable to an active condition at a initial time for producing at the output thereof a unique signal condition after an interval of time, said timing means including means for causing said interval to vary according to the sensed level of scene illumination;

interrogating means responsive to said filmspeed-indicating electrical signal condition and coupled to the output of said timing means for periodically momentarily interrogating the status of said output at a rate governed by said filmspeed-indicating electrical signal condition, said interrogating means including means for storing in said memory means a digital representation of the number of such interrogations as a successively incremented count, said interrogation means including means responsive to an interrogation detecting the presence of said unique signal condition for terminating further incrementation of said count, so that the value of said stored count is a representation of said product of scene illumination level and filmspeed.

2. The camera of claim 1 further including digital computer means associated with said memory means and operable responsively to a program stored in said memory means, said digital computer means including comparison sensing port means coupled to the output of said timing means, said program being adapted to cause the status of said sensing port means to be periodically momentarily interrogated for the presence of said unique signal condition, said program including a timing loop governed by said electrical signal condition indicative of filmspeed to cause the interrogation of said sensing port to be carried out at a rate governed by filmspeed.

3. The camera of claim 2 furhter including filmspeed sensing port means coupled to a plurality of sensing probes adapted to sense the states of a plurality of filmspeed-representing areas of a film-dispensing cassette, said program being adapted to interrogate the status of said filmspeed sensing port means and to govern said timing loop according to said sensings.

4. The camera of claim 3 wherein said program is adapted to formulate from said probe sensings a filmspeed-indicating digital number stored in said memory means to govern said timing loop.

5. The camera of claims 1, 2, 3, or 4 wherein said timing means includes means for causing said interval before the appearance of said unique signal condition to increase responsively to increasing sense illumination levels and said interrogation means includes means for causing said rate of interrogation to increase with increasing values of filmspeed.

6. The camera of claim 5 wherein said timing means includes waveform generating means for generating a timing waveform varying at a given rate from an initial value at said initial time and comparison means responsive to said timing waveform and said analogue signal for producing said unique signal condition when said timing waveform reaches a given state of comparison with said analogue signal.

7. The camera of claims 1, 2, 3, or 4 wherein said timing means includes waveform generating means for generating a timing waveform varying at a given rate from an initial value at said initial time and comparison means responsive to said timing waveform and said analogue signal for producing said unique signal condition when said timing waveform reaches a given state of comparison with said analogue signal.

* * * * *